United States Patent [19]

Espey et al.

[11] Patent Number: 5,350,266

[45] Date of Patent: Sep. 27, 1994

[54] PLASTIC CAPPED NUT

[75] Inventors: Carl R. Espey, Fairview Park; Donald A. Fischer, Strongsville, both of Ohio

[73] Assignee: Creco Corporation, Seville, Ohio

[21] Appl. No.: 141,481

[22] Filed: Oct. 22, 1993

[51] Int. Cl.⁵ .......................................... F16B 37/14
[52] U.S. Cl. .................................. 411/431; 411/377; 411/429; 403/375
[58] Field of Search ............... 411/377, 431, 374, 373, 411/372, 429, 910, 405, 407; 403/375, 381, 365, 367

[56] References Cited

U.S. PATENT DOCUMENTS

| | | | |
|---|---|---|---|
| 1,867,354 | 7/1932 | Dickson | 411/377 |
| 1,900,098 | 3/1933 | Cooper | 411/429 |
| 2,227,250 | 12/1940 | Dirrig | 200/59 |
| 3,960,047 | 6/1976 | Liffick | 85/32 R |
| 4,557,654 | 12/1985 | Masuda et al. | 411/431 |
| 4,576,533 | 3/1986 | Chartier | 411/373 |
| 4,600,344 | 7/1986 | Sutenbach et al. | 411/435 |
| 4,659,273 | 4/1987 | Dudley | 411/373 |
| 4,824,305 | 4/1989 | McCauley | 411/431 |
| 4,878,792 | 11/1989 | Froro | 411/372 |
| 4,962,968 | 10/1990 | Caplin | 411/431 |
| 4,968,202 | 11/1990 | Lanham | 411/431 |
| 4,993,902 | 2/1991 | Hellon | 411/430 |
| 5,082,409 | 1/1992 | Bias | 411/431 |
| 5,090,854 | 2/1992 | Hafeli | 411/186 |

OTHER PUBLICATIONS

*Bike Nashbar* Catalogue Holiday 1993 p. 47.

*Primary Examiner*—Flemming Saether
*Attorney, Agent, or Firm*—Rankin, Hudak & Hill

[57] ABSTRACT

The invention provides a nut and cap assembly, wherein the nut has relatively flat external side faces symmetrically located about a central axis, the side faces being symmetrical on opposite sides of a central plane perpendicular to the axis of the nut. Each of the side faces has two axially extending slots formed therein on opposite sides of the central plane. The slots are separated at their inner ends by a bridge portion in the respective side face of the nut. The assembly also includes a cap formed of relatively stiff resilient plastic material with a socket formed therein, corresponding generally to the shape of the nut. Each interior side wall of the socket of the cap has a projection extending radially inward and having a ramp portion facing toward the socket opening. During assembly, each projection is initially received in one slot of the nut, and during axial movement, the ramp of each projection engages the respective bridge portion of the respective side face of the nut so that the projection is urged radially outward. This flexes the socket walls sufficiently that the projections move axially over and beyond the bridge portion and lock in place in the other slot of the respective side face to secure the cap to the nut.

6 Claims, 1 Drawing Sheet

PLASTIC CAPPED NUT

BACKGROUND OF THE INVENTION

This invention relates to threaded metal fasteners namely nuts, and especially to protective and decorative covers or caps for nuts to guard against injury caused by sharp edges and corners. More particularly, the invention relates to a plastic cap that may be securely fastened to a nut once it is threaded to a tightened condition regardless of the particular orientation of the nut (i.e. regardless of which end of the nut faces the axial direction of tightening movement).

It is often advantageous to cover a metal nut with a plastic cap to prevent corrosion and to provide a decorative appearance. Also, in some instances, a plastic cap is desirable to prevent injury resulting from a person being cut or bruised by the sharp edges and corners of an unprotected nut.

This is particularly important in the case of nuts used on the front wheel fork shaft of a bicycle where the normally tubular shaft is journaled in a generally vertical sleeve forming part of the frame of the bicycle. Because of the location of the nut, there is a continuing risk that the rider might, under certain circumstances, be cut or bruised by contact with its side edges and corners.

While several types of nut and cap assemblies are available for the above purposes, all have certain inherent problems and limitations. For example, most arrangements for securing the cap to the nut, require that the cap be placed over only one particular end of the nut. Accordingly, if the nut is threaded onto a bolt, front wheel fork shaft of a bicycle, or in some other manner, in the wrong orientation, or in other words with the wrong end facing in the direction of axial movement of the nut during tightening, then the cap cannot be secured.

The nut and cap assembly of the present invention resolves the difficulties referred to above and affords other features and advantages heretofore not obtainable.

SUMMARY OF THE INVENTION

It is among the objects of the present invention to provide a protective cover for a nut so as to prevent portions of the nut from being corroded as a result of exposure to the weather or corrosive atmosphere.

Another object of the invention is to provide a nut and cap assembly having a more decorative appearance.

Still another object is to provide a nut and cap assembly that provides improved safety to protect persons from the relatively sharp side edges and corners of the nut.

A further object of the invention is to provide a nut and cap assembly wherein the cap may be easily secured to the nut regardless of which end of the nut the cap is applied to during assembly.

In accordance with the invention, there is provided a nut and cap assembly, wherein the nut has a central axis, an axial opening with internal threads and relatively flat external side faces symmetrically located about the central axis. The side faces are intersected by a central plane perpendicular to the central axis and are symmetrical on opposite sides of the central plane.

Each of the side faces has two axially extending slots formed therein on opposite sides of the central plane. The slots are separated at their inner ends by a bridge portion in the respective side face of the nut.

The assembly also includes a cap formed of relatively stiff resilient plastic material with a socket formed about a central axis. The socket has interior side faces corresponding to the external side faces of the nut and terminates at one end in an opening defined by the end edges of the side walls.

The nut and cap are assembled in coaxial relation with the nut secured within the socket of the cap. Each sidewall of the cap has a projection extending radially inward and having a ramp portion facing toward the end opening. During assembly, each projection is initially received in one slot of the nut and during axial movement, the ramp of each projection engages the respective bridge portion of the nut so that the projection is urged radially outward. This flexes the socket sufficiently that the projections move axially over and beyond the bridge portion and lock in place in the other slot of the respective side face to secure the cap to the nut.

DESCRIPTION OF THE PREFERRED EMBODIMENT

Figure 1:
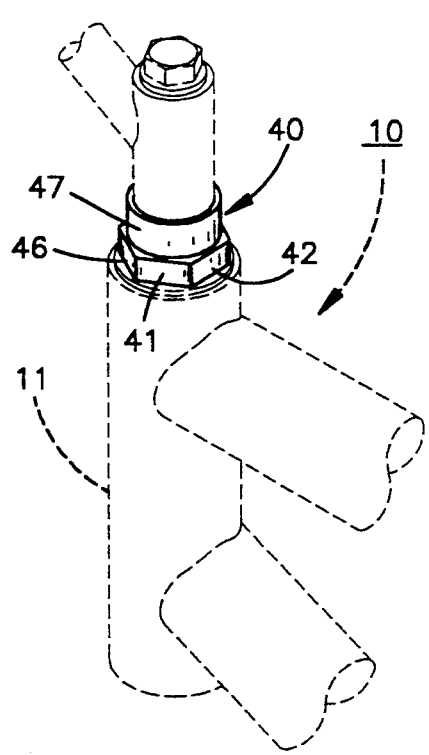
FIG. 1 is a perspective view showing a portion of a bicycle frame in dashed lines and a nut and cap assembly embodying the invention.

Referring more particularly to the drawings, there is shown a portion of a bicycle frame 10 including a tubular member 11 in which the front wheel fork steering shaft 12 is located. The front wheel fork shaft 12 is generally tubular and is inserted through the frame tube 11 and journaled therein with a threaded upper tubular portion 13 thereof, extending slightly beyond the upper end of the tube 11. Normally, a handle bar rod 14 is inserted in and secured to the upper end of the front wheel fork shaft in an adjustable manner to permit both raising and lowering of the handle bar as well as proper centering in a position in alignment with the front wheel.

The wheel fork shaft 12 is secured in position within the tube 11 by means of a nut 20 that is specially adapted to receive a cap 40 to provide a nut and cap assembly embodying the invention.

The nut 20 has six, generally planar side faces 21, 22, 23, 24, 25 and 26 as well as parallel end faces 27 and 28. The nut is generally symmetrical about a central plane perpendicular to the central axis of the nut. The nut has an axial opening 30 provided with internal threads 31.

It will be apparent that the nut is bi-directional, or in other words, that it may be threaded into position regardless which end face 27, 28 is oriented to face in the axial direction of tightening movement.

Each side face of the nut is provided with two opposed slots 32 and 33 in axial alignment with one another, parallel to the central axis of the nut and having their outer ends formed in the respective end face 27 and 28 of the nut. The inner ends of the opposed slots 32 and 33 are separated by a bridge portion 34 that lies in the central plane of the nut. At opposite sides of the bridge portion 34 are slot end walls 35 and 36.

Figure 2:
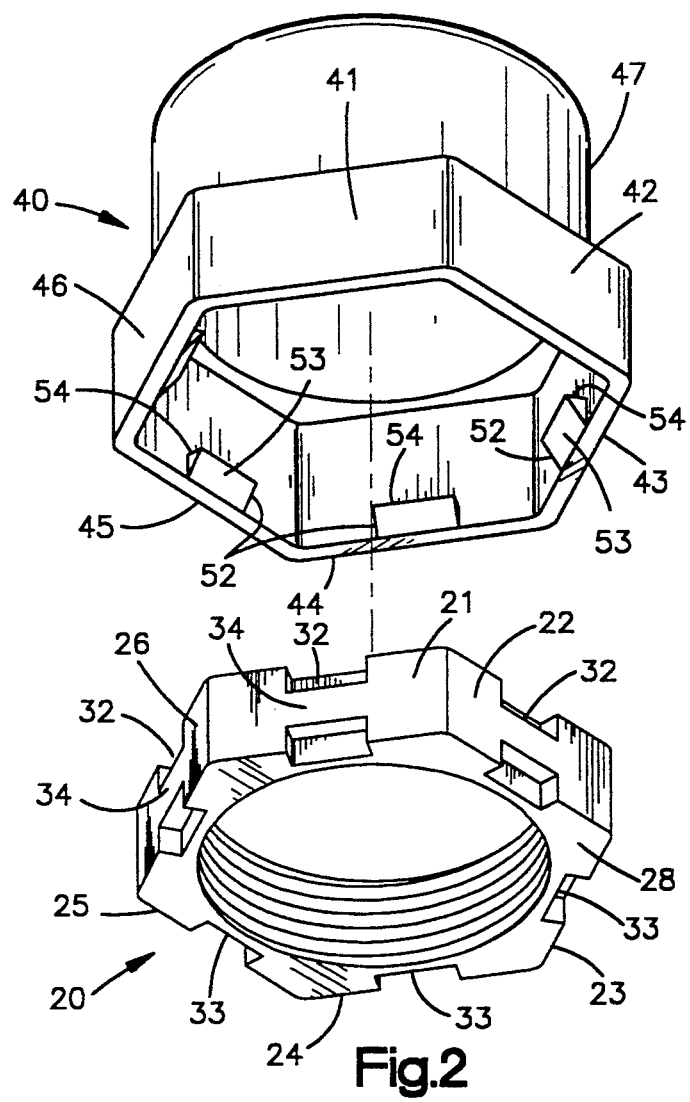
FIG. 2 is an exploded perspective view showing the nut and cap assembly of the invention.
Figure 3:
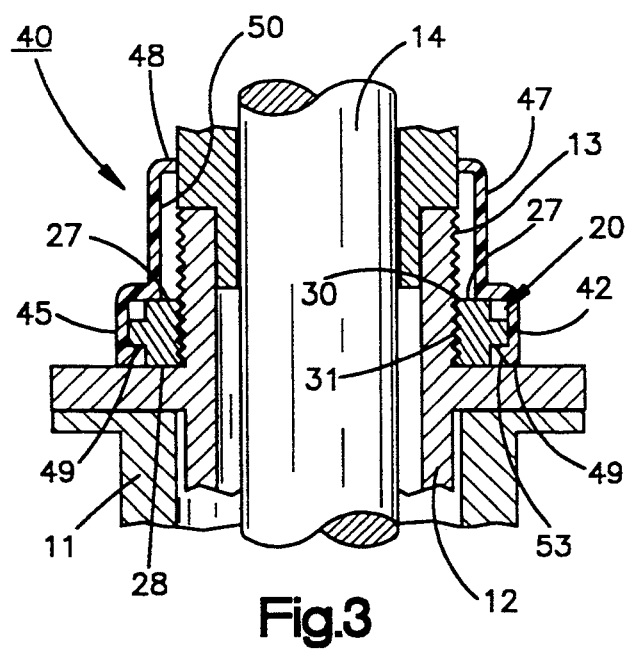
FIG. 3 is a transverse cross-sectional view showing a nut and cap of the present invention in assembled relation.
Figure 4:
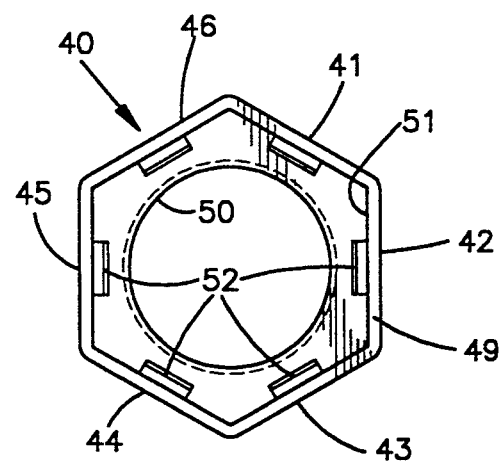
FIG. 4 is an elevational view taken from below the cap forming part of the nut and cap assembly of the invention.

The cap 40 is formed of relatively stiff deformable resilient plastic material and has six side walls 41, 42, 43, 44, 45 and 46 formed at the lower portion as viewed in FIGS. 1 and 2. A cylindrical wall 47 is formed at the upper end of the cap 40 and has an upper end face 48. The lower end edges of the side walls 41–46 define a lower end face 49.

The cylindrical wall 47 defines an interior circular passage 50 that communicates with a hexagonal socket 51 defined by the inner faces of the sidewalls 41–46. It will be apparent that the socket 51 is in conformance with the side faces 21–26 of the nut so that the socket is adapted to receive the nut when in assembled relation.

Each of the side walls, 41–46 is provided with a radial projection 52 that extends inwardly from the inner face of the respective side wall and that is located at the outer end portion of the respective wall as indicated in FIG. 2. Each projection has a ramp 53 extending inwardly and downwardly. The inner end of the projection 52 has an inner end face that is parallel to the central transverse plane of the cap 40.

With this arrangement, the cap 40 may be assembled to the nut 20 in the following manner:

Once the nut is tightened into position, such as on the tubular front wheel fork shaft of a bicycle, the cap is placed in axial alignment with the nut with its sidewalls 41–46 aligned with the side faces 21–26 of the nut. Then the cap is pressed downwardly over the nut in such a way that the projections 52 are received in the respective slot 32 of the side faces of the nut 20. As the cap is moved further, the ramps 53 of the projections 52 engage the bridge portions 34 of the nut so that further movement flexes the sidewalls 41–46 radially outwardly to permit the projections to move across the respective bridge.

Once the projections have moved in a axial direction sufficient to clear the bridge, the walls flex inwardly to bring the inward end faces 54 of the projections in tight contact with the end wall 36 of the respective second slot 33.

It will be seen that this arrangement is particularly advantageous in the case of bicycle front wheel shafts in that the cap protects against injury caused by the side edges and corners of the nut. Also, the cap provides a decorative appearance, while at the same time, protecting the nut from corrosion.

While the invention has been shown and described with respect to a particular embodiment thereof, this is for the purpose of illustration rather than limitation and other variations and modification of the specific device herein shown and described will be apparent to those skilled in the art, all within the intended spirit and scope of the invention. Accordingly, the invention is not to be limited in scope and effect to the specific embodiment herein shown and described nor in any other way that is inconsistent with the extent to which the progress in the art has been advanced by the invention.

We claim:

1. A nut and cap assembly comprising:
   a nut having a central axis, an axial opening with internal threads and external side faces symmetrically located about said axis and parallel thereto, said faces being intersected by a central plane perpendicular to said axis, each of said faces having first and second axially extending slots formed therein on opposite sides of said central plane and symmetrical therewith, and being separated at their inner ends by a bridge portion in the respective face, and
   a cap for said nut formed of relatively stiff resilient plastic material and having a socket formed therein with interior side faces corresponding to the external side faces of said nut, whereby said cap and nut may be assembled with said nut received within said socket of said cap,
   at least two of said interior side faces of said socket having a projection extending radially inward therefrom, said projection having a ramp portion facing outwardly relative to said socket,
   said projection being located generally in alignment with said first slot of the respective side face of said nut when said cap and nut are oriented for assembly,
   whereby during assembly of said cap and nut said projection is initially moved axially within the respective first slot and when said ramp engages said respective bridge portion of said nut, said projection is urged radially outward to flex said socket sufficiently that said projection moves axially over and beyond said bridge portion and locks in said second slot to secure said cap to said nut.

2. A nut and cap assembly as defined in claim 1, wherein said cap has a central opening formed therein extending from said socket to the end of said cap opposite the end in which the socket is formed.

3. A nut and cap assembly as defined in claim 2, wherein said opening is circular and is adapted to receive a cylindrical member that extends through the interior of said nut.

4. A nut and cap assembly as defined in claim 2, wherein said nut is received on the front wheel fork shaft of a bicycle.

5. A nut and cap assembly as defined in claim 1, wherein each interior face of said socket has one of said radial projections formed therein.

6. A nut and cap assembly as defined in claim 1, wherein said nut and socket are of hexagonal shape.

* * * * *